United States Patent [19]

Ishii et al.

[11] Patent Number: 4,938,819
[45] Date of Patent: Jul. 3, 1990

[54] METHOD OF MAKING A COMPOSITE PANEL OF A FOAM MATERIAL

[75] Inventors: Seiji Ishii; Hiroya Fukuda; Takashi Ohashi, all of Yokohama, Japan

[73] Assignee: Bridgestone Corporation, Tokyo, Japan

[21] Appl. No.: 211,719

[22] Filed: Jun. 7, 1988

[30] Foreign Application Priority Data

Jun. 8, 1987 [JP] Japan .................. 62-141557
Apr. 19, 1988 [JP] Japan .................. 63-94680
May 7, 1988 [JP] Japan .................. 63-109913

[51] Int. Cl.$^5$ .................. B29C 67/20; B32B 5/18; B32B 5/20
[52] U.S. Cl. .................. 156/78; 264/46.2; 264/46.4; 264/48; 264/54
[58] Field of Search .................. 264/54, 48, 51, 45.5, 264/53, 50, 46.2, 46.3, 46.4, 257; 156/78

[56] References Cited

U.S. PATENT DOCUMENTS

| | | | |
|---|---|---|---|
| 2,850,467 | 9/1958 | Livingood | 264/54 |
| 3,617,594 | 11/1971 | Willy | 264/46.2 X |
| 3,627,603 | 12/1971 | Greig | 264/46.3 X |
| 3,738,895 | 6/1973 | Paymal | 264/46.2 X |
| 3,874,964 | 4/1975 | Cogliano et al. | 156/78 |
| 3,966,521 | 6/1976 | Patton, Jr. et al. | 156/78 |
| 4,374,934 | 2/1983 | Raynor | 264/46.4 X |
| 4,451,310 | 5/1984 | Lairloup | 156/78 |

FOREIGN PATENT DOCUMENTS 57-22013 5/1982 Japan .
58-53465 11/1983 Japan .
61-51544 11/1986 Japan .
64-85234 3/1989 Japan .
1-267026 10/1989 Japan .
1-280552 11/1989 Japan .

*Primary Examiner*—Jeffery Thurlow
*Assistant Examiner*—Leo B. Tentoni
*Attorney, Agent, or Firm*—Cushman, Darby & Cushman

[57] ABSTRACT

A method of making a foam product including the steps of reacting an isocyanate component with a polyol component and foaming with a foaming agent to form a self-supporting intermediate foam material. The isocyanate component is present in excess of a stoichiometric quantity needed to react with the polyol component. The self-supporting intermediate foam material is then contacted with water and the self-supporting, intermediate foam material is heated to form a foam product, the water reacting with the remaining unreacted isocyanate component. The self-supporting, intermediate foam material formed by the first foaming step is rigid or semi-rigid at room temperature but it can be softened by heating to enable it to be used for deep draw molding in a successive cure molding process without cracking, splitting or being destroyed. Once the self-supporting, intermediate foam material is contacted with water or steam in the final cure molding process to react the remaining isocyanate component, the material becomes a finally cured, rigid or semi-rigid foam material which will not soften on heating. The self-supporting, intermediate foam material can be laminated with facing materials or reinforced with glass fiber—non-woven cloth or the like to give a composite panel which exhibits stiffness, heat insulation, acoustic insulation, moisture resistance and is light in weight so that it can be used for a molded ceiling or door panel in an automobile or a partition or screen for interior use.

15 Claims, 3 Drawing Sheets

METHOD OF MAKING A COMPOSITE PANEL OF A FOAM MATERIAL

BACKGROUND OF THE INVENTION

1. Field of the Invention

The present invention relates to a method of making a rigid or semi-rigid lightweight foamed material which exhibits excellent stiffness, heat insulation, acoustic insulation and moisture resistance. The present invention further relates to a composite panel made from such a rigid or semi-rigid lightweight foamed material which can be used for forming a molded ceiling or a door panel for an automobile, a partition or screen for interior use, and the like. 2. Description of the Related Art Conventionally, a rigid or semi-rigid plastic foam material is used to form interior finishes of automobiles such as molded ceilings, door panels and the like because such materials are lightweight and exhibit heat insulation and acoustic insulation properties.

Such plastic foams have been used as a core material for foaming a composite panel by laminating inorganic reinforcing sheets such as a glass fiber mat, a carbon fiber mat or a non-woven cloth made of polyester fiber or polyamide fiber on one or both sides through the use of adhesives. However, the foregoing conventional method of forming plastic foams has a number of problems. For example, although the inorganic reinforcing sheet such as the glass fiber mat, exhibits excellent reinforcing characteristics, forming a glass fiber mat pollutes the work environment and irritates the worker's skin. Furthermore, cutters used to trim the edges of such products are easily worn and damaged by such glass fiber mats. Even further, the glass fiber mat is relatively heavy so that the finished product is heavy.

Non-woven cloth made from polyester fibers, on the other hand, does not have sufficient strength to yield a desired reinforcing effect and anisotropic in tensile strength. Therefore, such materials cannot be practically used as a reinforcement. Furthermore, as the non-woven cloth has a large elongation rate, particularly at higher temperatures, the stiffness of a composite panel reinforced with non-woven cloth will decrease remarkably at higher temperatures.

In the case where severe follow-up property to a mold is required as in the case of deep draw molding, the lightweight foam or the core-material should be thermoplastic. However, such a core-material will lessen the heat resistance of the final product and a panel with sufficient stiffness at high temperatures cannot be produced.

If the rigid or semi-rigid foamed material is formed from polyurethane foam, phenol foam, and the like by the one shot method, it is generally produced as a block. When the block is sliced and a board thus foamed is applied to press working, it is apt to cause cracking or splitting which is especially disadvantageous for deep draw molding.

To solve the foregoing problem, it has been proposed that the liquid raw materials of the foam be cast into a mold to be foamed and cured in the mold. However, there are problems associated with the moldability such as insufficient fluidity of the foamed material to fill gaps of under 10 mm in width and a deterioration of the surface condition of the molded product. There is also the problem of increase in surface density of the molded product which causes an increase in the total weight of the product and a difficulty in manufacturing composite materials by such process.

It was recently proposed that an isocyanate component(B) be impregnated into a flexible porous material(A) and reacted with water to form a network structure to improve the moldability (Japanese Patent Publication Tokkosho 61-51544, USP 4451310, Japanese Publication Tokkosho 57-22013 and Japanese Patent Provisional Publication Tokkaisho 58-53465). However, this method may deteriorate the working environment as a result of the impregnated isocyanate component(B). Furthermore, when a soft polyurethane foam is used as the flexible porous material, it may swell as a result of the impregnation with isocyanate component. This in turn lowers the foam strength and results in a decrease in workability and dimensional stability of the material. As a result, the impregnated quantity of isocyanate component must be increased to make up for the strength of rigid foam material. This, in turn, disadvantageously increases the weight of the product.

The mechanism of molding and curing the flexible porous material and isocyanate component is not a chemical reaction but a formation of simple physical composite. As the flexibility necessary for molding depends upon the flexible porous material produced beforehand and the isocyanate component independently reacts with water to be cured, the final product is considered to be a physical composite of the flexible material and the cured material.

SUMMARY OF THE INVENTION

It is an object of the present invention to provide a method of manufacturing a lightweight rigid or semi-rigid foamed material which exhibits excellent stiffness, heat insulation, acoustic insulation, moisture resistance and heat resistance without cracking or splitting during the deep drawing molding.

It is a further object of the present invention to provide a method of manufacturing a composite panel which exhibits excellent stiffness, heat insulation, acoustic insulation, moisture resistance and heat resistance so as to be suitable for use as a ceiling or a door panel and the like for an automobile or a partition or a screen or the like for interior use.

DETAILED DESCRIPTION OF THE PRESENTLY PREFERRED EXEMPLARY EMBODIMENTS

Figure 1:
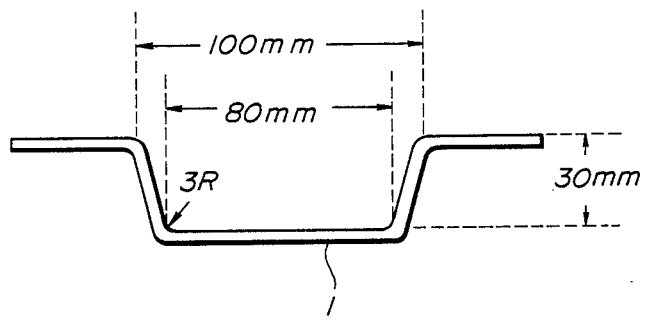
FIG. 1 illustrates the shape of the molded product by deep drawing molding in the EXAMPLES.

It has been discovered that in the production of polyurethane foam by reacting isocyanate component with polyol component in the presence of organic foaming agent and/or water, a practically thermoplastic foam can be produced when an excess quantity of the isocyanate component than the stoichiometric equivalent to the polyol component and water was used in the reaction, and the thermoplastic foam thus produced became a rigid or semi-rigid foam without softening any more at elevated temperatures when it was contacted with water or steam to react the isocyanate component remaining therein with water while heating. As a result of this discovery, the first invention made was a method of manufacturing a rigid or semi-rigid foamed material which comprises a foaming process for forming a practically thermoplastic foamed material wherein isocyanate component is reacted with polyol component in the presence of organic foaming agent and/or water in a condition that an excess quantity of the isocyanate component and the stoichiometric equivalent of the polyol component and water is used in the reaction and a successive cure molding process wherein the practically thermoplastic foamed material is contacted with water or stem to react the isocyanate component remaining therein with water while heating.

The cure molding mechanism of the invention which produces a rigid or semi-rigid foamed material is that the thermoplastic intermediate foamed material containing residual NCO group is taken out and the remaining chemical reaction is completed while heating to produce a thermosetting resin.

The resulting cure molded product exhibits excellent stiffness, is lightweight, provides heat insulation and acoustic insulation as well as moisture resistance. Further, the cure molded product does not crack or split during the deep draw molding process.

A known material such as aliphatic or aromatic isocyanate or a combination thereof can be used as the isocyanate component. If necessary, a prepolymer with the end radical of -NCO obtained by partial reaction between isocyanate and polyol can be employed.

As the polyol component, polyols generally used for the production of polyurethane foam, for example, dihydric alcohol such as ethyleneglycol, propyleneglycol, 1,4-butanediol, diethyleneglycol etc.; Quadri- or more hydric alcohol such as pentaerythritol, sorbitol, sucrose etc.; additional polymerization products of said polyhydric alcohol with alkyleneoxide such as propyleneoxide, ethyleneoxide etc.; polyether type polyol such as addition polymer of aliphatic or aromatic polyamine or alkanolamine with alkyleneoxide; so called polymer polyol obtained by graft polymerization of vinyl monomer to polyeterpolyol; or polyester type polyol obtained by condensation polymerization of polybasic acid with polyhydric alcohol can be used. Especially, when polymer polyol is used as a part of the polyol component, smooth curing reaction proceeds accompanying the cell opening effect of foams which gives a preferable effect to the formation of rigid foamed material.

The manufacturing method of the first invention comprises the following two steps.

(1) The foaming process (the first step)

The foaming process is classified into three operating modes, that is:

(a) reacting polyol component with isocyanate component in the presence of water;
(b) reacting polyol component with isocyanate component in the presence of organic foaming agent;
(c) reacting polyol component with isocyanate component in the presence of organic foaming agent and water;

The three modes will be explained in detail hereunder.

(a) A mode wherein the reaction is carried out in the presence of water.

In this mode, the water and the polyol component react with the isocyanate component to form a polyurethane polyurea resin and by-produced carbon dioxide acts to foam the resin at the same time.

The mixing ratio of the isocyanate component to the polyol component and the water is set so as to leave unreacted isocyanate component in the foam obtained by reacting an excess quantity of the isocyanate component than the stoichiometric equivalent to the polyol component and the water. The quantity of the isocyanate component to be used is 1.2 to 5 times, preferably 1.5 to 2.5 times of stoichiometric quantity to react with the polyol component and the water.

As to the ratio of the polyol component to water, when the ratio of water is excessive, though the foam obtained is a rigid one at room temperature and softens at elevated temperatures, it has less flexibility at room temperature and tends to become powder at pressing, and the final cured product obtained by contacting it with water or steam is a rigid and brittle one.

On the contrary, when the ratio of the polyol component is excessive, the foam obtained is a soft and sticky one difficult to handle and the final cured product obtained by contacting it with water or steam becomes a non-rigid one. As the aspect of this phenomenon varies depending upon kinds of the isocyanate component and the polyol component used, so the ratio of water must be adjusted considering the workability and desired properties corresponding to the purpose of the final products.

During foaming, catalyst or surface active agent etc. may be added if necessary, but kinds and quantities thereof may be the same as used for producing general polyurethane foam and they are not limited.

(b) A mode wherein the reaction is carried out in the presence of an organic foaming agent.

In this case, the organic foaming agent acts to foam the polyurethane resin obtained by the reaction of the isocyanate component and the polyol component.

As the organic foaming agent, fluorocarbons such as monochlorotrifluoromethane etc. as well as methylenechloride etc. may be used and the scope of kinds is not limited.

In this mode, the mixing ratio of the isocyanate component to the polyol component is set as to leave unreacted isocyanate component in the foam obtained by reacting an excess quantity of the isocyanate component than the stoichiometric equivalent to the polyol component. The quantity of the isocyanate component to be used is 2 to 5 times, preferably 1.5 to 2.5 times of stoichiometric quantity to react with the polyol component.

Within this range, the ratio of the isocyanate component to the polyol component, or the additional quantity of the organic foaming agent may be determined appropriately depending upon the purpose of the final products and they are not limited.

During foaming, catalyst or surface active agent etc. may be added if necessary, but kinds and quantities thereof may be the same as used for producing general polyurethane foam and they are not limited.

(c) A mode wherein the reaction is carried out in the presence of water and or organic foaming agent.

In this mode, the water is used to adjust the stiffness of the foamed material.

The mixing ratio of the isocyanate component to the polyol component and the water is set so as to leave unreacted isocyanate component in the foam obtained by reacting an excess quantity of the isocyanate component than the stoichiometric equivalent to the polyol component and the water. The quantity of the isocyanate component to be used is 1.05 to 5 times, preferably 1.2 to 2.5 times of stoichiometric quantity to react with the polyol component and the water.

As to the quantity of water to be used, the quantity of water is recommended to be less than 4.0 weight parts, preferably 0.2 to 3.0 weight parts per 100 weight parts of the polyol component.

When the ratio of water is excessive, though the foam obtained is a rigid one at room temperature and softens at a higher temperature, it has less flexibility at room temperature and tends to become powder at pressing, and the final cured product obtained by contacting it with water or steam is a rigid and brittle one.

Further, when the ratio of water is excessive, more isocyanate component is necessarily required, not only causing instability during foaming but also causing an accumulation of the heat of reaction which increases the internal temperature of the foam which deteriorates the property of the foam and increases the risk of spontaneous combustion during block molding.

On the contrary, when the quantity of water is too small, the foaming of the reaction product to make a low density foam has to be performed with the organic foaming agent only, and the intermediate foam obtained is a soft one which is difficult to handle and preserve, and the rigidity of the final cured product is lower.

Accordingly, the quantity of the organic foaming agent and water to be used should be chosen considering the foregoing and the purpose of the final products.

As the organic foaming agent, those mentioned in item (b) can be used.

During foaming, catalyst or surface active agent etc. may be added if necessary, but kinds and quantities thereof may be the same as those used for producing general polyurethane foam and they are not limited.

(2) Cure molding process (the second step)

The intermediate thermoplastic foamed material thus produced in the first step has a quick-curing capability. A board with an appropriate thickness to be applied in the cure molding process can be produced either by foaming a block first and then slicing the block into boards of a certain thickness or producing boardlike molded foamed material directly.

As the thermoplastic foamed material thus produced is likely to become a non-thermoplastic resin foam by the reaction of isocyanate component remaining therein with moisture in the air on standing, it is necessary to keep it in a dry atmosphere or to be wrapped with moisture impermeable film when it is stored for a long time. It is recommended that thermoplastic foamed material be used quickly in accordance with the pot life of it, by contacting it with water or steam to be cure molded.

The quantity of water or steam to be contacted with the intermediate thermoplastic foamed material in the cure molding process is more than the chemical equivalent to react with the isocyanate remaining therein, preferably an excess quantity so long as the water does not wet the final product to deteriorate the appearance or properties thereof. Catalyst may be added to accelerate the reaction. The water may be added in the form of resin emulsion.

The cure molding while heating is preferably performed by using a heat-press. If necessary, a cloth, a non-woven cloth, a sheet of polyvinylchloride etc. may be laminated with adhesive as the facing material, or a glass fiber cloth, a glass fiber mat etc. may be integrated as the reinforcement.

The temperature at the cure molding is not limited, but a temperature of 100° C. or higher, preferably 100 to 150° C. is recommended to increase the productivity.

The first invention can be more fully understood upon consideration of the following EXAMPLES.

EXAMPLE 1

A block with a thickness of 300 mm, a width of 300 mm and a length of 300 mm was produced by mixing the raw materials as shown in TABLE 1.

TABLE 1

| Raw materials | Quantity Used (grams) |
|---|---|
| Crude MDI (Mitsui Nisso Urethane Co.: MDI-CR) | 100 |
| Water | 1.2 |
| Polyol (Sanyo Kasei Co.: FA-703) | 75 |
| Polyol (Mitsui Nisso Urethane Co.: SU-450L) | 25 |
| Catalyst (N-methylmorpholine) | 1.0 |
| Surface active agent (Nippon Unicar Co.: L-5740) | 1.0 |

The quantity of isocyanate component corresponding to that of polyol component and water written in the formulation of TABLE 1 was 2 times by stoichiometric equivalent.

By slicing the thus produced block 10 minutes after production, a board was obtained with a thickness of 10 mm, a width of 250 mm and a length of 250 mm. The board was a rigid and somewhat brittle foamed material at room temperature, but thermoplastic with the softening temperature of 100° C.

The thermoplastic board was sprayed with water by an atomizer, then press-molded for 2 minutes by deep draw molding in a shape (1) as shown in FIGURE I, using a metal mold heated at 110° C.

The molded product was a rigid foamed material without cracks or splits etc. and a rigid one without softening by heating again at 100° C.

EXAMPLE 2

Using the same mixing ratio of raw materials as EXAMPLE 1, an intermediate boardlike formed material was produced with a thickness of 10 mm, a width of 1500 mm and a length of 1800 mm.

Figure 2:
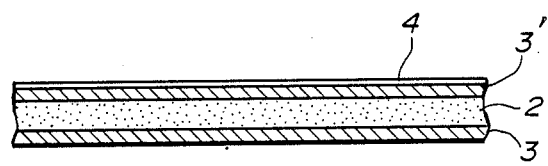
FIG. 2 illustrates the structure of the composite panel manufactured in EXAMPLE 2.

As shown in FIG. 2, on both sides of the intermediate foamed material(2), two sheets of glass fiber mat (3 & 3') (100 g/m2; a width of 1500 mm and a length of 1800 mm) spread with polyurethane type adhesive were laminated and further laminated a PVC facing sheet (4) (300 g/m$_2$; a width of 150 mm and a length of 1800 mm) was further laminated on one side of the glass fiber mat(3)'s side), was heat-pressed and was made a ceiling for a car. Press condition was 120° C for 2 minutes.

Physical properties of a sample cut out from the central part of this molded ceiling are shown in TABLE 2.

Figure 3:
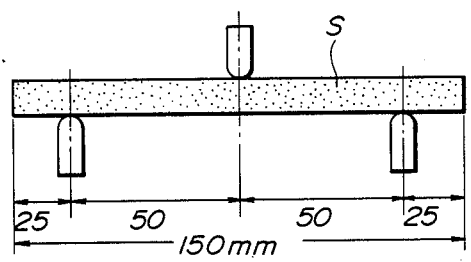
FIG. 3 illustrates the method for measuring the bending strength of the composite panel.

Bending strength of the sample(s) was measured as illustrated in FIGURE 3, by putting a load on the central part (distance between fulcrum was 100 mm) of the sample with a width of 50 mm and read the maximum load.

TABLE 2

| Item | Measured Value |
|---|---|
| thickness (mm) | 8 |
| weight (g/m$_2$) | 840 |
| bending strength (kg/50 mm width) | 2.3 |

EXAMPLE 3

A block with the same size as that of EXAMPLE 1 was produced by mixing the raw materials as shown in TABLE 3.

TABLE 3

| Raw materials | Quantity used (grams) |
|---|---|
| Crude MDI (Mitsui Nisso Urethane Co.: MDI-CR) | 100 |
| Polyol (Mitsui Nisso Urethane Co.: SU-450L) | 40 |
| Polyol (Sanyo Kasei Co.: FA-703) | 60 |
| Catalyst (Sanyo Air Products Co.: DABCO33LV) | 0.6 |
| Surface active agent (Nippon Unicar Co.: L-5740) | 0.3 |
| Monochlorotrifluoromethane (Asahi Glass Co.: F-11) | 36 |

The quantity of isocyanate component corresponding to that of polyol component written in the formulation of TABLE 3 was 2 times by stoichiometric equivalent.

By slicing the thus produced block ten minutes after the production, a board was obtained with the same size as that of EXAMPLE 1, which was a rigid foamed material stable at room temperature, but thermoplastic with the softening temperature of 100° C.

The thermoplastic board was sprayed with water by anatomizer, then pressure-molded for 2 minutes by deep draw molding in a shape(1) as shown in FIGURE 1, using a metal mold heated at 110° C.

The molded product was a rigid foamed material without cracks or splits etc. and a rigid one without softening by heating again at 100° C.

EXAMPLE 4

Using the same mixing ratio of raw materials as EXAMPLE 3, an intermediate thermoplastic foamed material with the same size as that of EXAMPLE 2 was produced, and a ceiling for car use as shown in FIG. 2 was produced in the manner described in EXAMPLE 2. Press condition was 110° C. for 110° C for 2 minutes.

TABLE 4

| Items | Measured Value |
|---|---|
| Thickness (mm) | 8 |
| Weight (g/m$_2$) | 850 |
| Bending strength (kg/50 mm width) | 2.2 |

Physical properties of the sample cut out from the central part of this molded ceiling are shown in TABLE 4.

EXAMPLES 5-8

Blocks with the same size as that of EXAMPLE 1 was produced by mixing the raw materials as shown in TABLE 5.

The quantity of isocyanate component corresponding to that of polyol component and water written in the formulation of TABLE 5 was 2 times by stoichiometric equivalent.

TABLE 5

|  | Ex. 5 | Ex. 6 | Ex. 7 | Ex. 8 |
|---|---|---|---|---|
| Polyol A*$^1$ | 30 | 30 | 0 | 0 |
| Polyol B*$^2$ | 0 | 0 | 30 | 30 |
| Polyol C*$^3$ | 40 | 0 | 40 | 0 |
| Polyol D*$^4$ | 0 | 40 | 0 | 40 |
| Water | 1.5 | 1.5 | 1.5 | 1.5 |
| Catalyst A*$^5$ | 0.5 | 0.5 | 0.5 | 0.5 |
| Catalyst B*$^6$ | 0.1 | 0.1 | 0.1 | 0.1 |
| Surface active agent*$^7$ | 0.5 | 0.5 | 0.5 | 0.5 |
| Organic foaming agent*$^8$ | 30 | 30 | 30 | 30 |
| Isocyanate (NCO index)*$^9$ | 109 (200) | 108 (200) | 116 (200) | 115 (200) |
| Stability of foaming | good | good | good | good |
| Density of foam (g/cm$^3$) | 0.019 | 0.020 | 0.019 | 0.020 |
| Thermal plasticity | good | good | good | good |

*$^1$Takeda Pharmaceutical Co.: GR-30; OH value = 400.
*$^2$Mitsui Nisso Urethane Co.: SU-450L; OH value = 450.
*$^3$Sanyo Kasei Co.: FA-703; OH value = 33.
*$^4$Asahi Glass Co.: EL-910; OH value = 28.
*$^5$Sankyo Air Products Co.: DABCO33LV (33% DPG solution of triethylenediamine)
*$^6$Nitto Kasei Co.: Neostan U-100 (dibutyltindilaurate)
*$^7$Nippon Unicar Co.: L-5740S (dimethylpolysiloxane + PO + EO)
*$^8$Asahi Glass Co.: F-11 (monochlorotrifluoromethane)
*$^9$Sumitomo Bayer Urethane Co.: SIMIDUR 44V-20 (crude MDI)

By slicing the thus produced block ten minutes after the production, a board was obtained with a thickness of 9 mm, a width of 250 mm and a length of 250 mm, which was a rigid foamed material stable at room temperature, but thermoplastic with the softening temperature of 100°C.

The thermoplastic board was sprayed with water by an atomizer, then press-molded for 2 minutes by deep drawing in a shape (1) as shown in FIG. 1, using a metal mold heated at 115°C.

Molded product was a rigid foamed material without cracks or splits etc. and a rigid one without softening by heating again at 100°C.

EXAMPLE 9-12

Using the same mixing ratio of raw materials as shown in TABLE 5, intermediate thermoplastic foamed materials with a thickness of 9 mm, a width of 1500 mm and a length of 1800 mm were produced, and ceilings for car use as shown in FIG. 1 were produced in the manner described in EXAMPLE 2. Press condition was 115°C. for 2 minutes.

Physical properties of the samples cut out from the central part of this molded ceiling are shown in TABLE 6.

TABLE 6

|  | Ex. 9 | Ex. 10 | Ex. 11 | Ex. 12 |
|---|---|---|---|---|
| Thickness (mm) | 8 | 8 | 8 | 8 |
| Weight (g/m$^2$) | 735 | 730 | 730 | 735 |
| Bending strength | 2.1 | 1.9 | 2.0 | 2.0 |

TABLE 6-continued

| | Ex. 9 | Ex. 10 | Ex. 11 | Ex. 12 |
|---|---|---|---|---|
| (kg/50 mm width) | | | | |

The second invention is a manufacturing method of a composite panel using the above described rigid or semi-rigid foamed material according to the first invention.

That is, the second invention is a manufacturing method of a composite panel which comprises making an integrated material by putting a non-woven cloth impregnated with isocyanate component on the top of a practically thermoplastic foamed material produced by reacting isocyanate component with polyol component in the presence or organic foaming agent and/or water wherein an excess quantity of the isocyanate component than the stoichiometric equivalent to the polyol component and water is used in the reaction, and successively cure molding said integrated material by contacting it with water or steam to react the isocyanate component remaining therein with water while heating.

The isocyanate component, the polyol component and the organic foaming agent to be used to produce a practically thermoplastic foamed material can be selected from those described above, and the preferable ratios of these components is the same as described above.

As the non-woven cloth to be used in the present invention, any kind of non-woven cloth usually of sheet form can be used regardless of the manufacturing method, such as a dry method, a wet method or a span-bond method.

As the kind of fiber in the non-woven cloth, it includes natural fiber such as cotton, hemp, wool; semi-synthetic fiber such as acetate rayon, viscose rayon; synthetic fiber such as polyamide, polyester, polyacrylonitrile, polyvinylchloride, polyolefin, polyvinylalcohol; mineral fiber such as asbestos; inorganic fiber such as steel fiber, stainless steel fiber, carbon fiber, glass fiber. However, from the view point to make a lightweight composite panel and the safety of workers, mineral fibers such as asbestos and inorganic fiber such as steel fiber, stainless steel fiber, carbon fiber, glass fiber are not preferable.

Though synthetic resins are often used to make a non-woven cloth from these fibers, the presence of the binder or the kind of the binder is not limited in the present invention.

As to the weight per unit area (g/m$^2$) of the non-woven cloth, it may be selected from the view point of the object of the application of the composite panel manufactured. Of course, a lighter weight non-woven cloth gives a lighter weight panel.

As to the tensile strength of the nonwoven cloth, generally, the higher the better to attain a greater reinforcing effect.

However, in the second invention, as the cured product of the isocyanate component impregnated in the non-woven cloth exhibits a remarkable reinforcing effect with the aid of fibers in the non-woven cloth, the tensile strength of the non-woven cloth itself is not determinative to the strength of the composite panel. It should be noted that a non-woven cloth with too high a tensile strength tends to cause a problem of moldability such as the generation of wrinkle in the cure molding process, especially in the deep draw molding. In the case of a flat panel, the higher strength of the non-woven cloth gives preferable effect only. In conclusion, the tensile strength of the non-woven cloth to be used should be chosen to respond to the shape and the quality required of the composite panel of be manufactured.

In general, to make a deep draw panel according to the present invention, a non-woven cloth with a tensile strength of 0.3–50 kg/3cm width, preferably 0.3–20 kg/2cm width and a elongation rate of over 10%, preferably over 15% is recommended.

To make a flat panel, any non-woven cloth with a tensile strength over 0.3 kg/3cm width can be used, and the upper limit of the preferable tensile strength can be used, and the upper limit of the preferable tensile strength is not necessarily limited. Similarly, the elongation rate is not necessarily limited.

For the isocyanate component to be impregnated in the non-woven cloth, generally known aliphatic or aromatic isocyanate or those combination can be used, and if necessary,.a prepolymer with the end radical of —NCO obtained by partial reaction between isocyanate and polyol can be used.

The isocyanate component to be impregnated in the non-woven cloth can be the same kind or a different kind of isocyanate component than that used to produce the core foamed material, that is, the practically thermoplastic foamed material.

To help the impregnation of the isocyanate component into the non-woven cloth, it is all right to dilute the isocyanate with some solvent to lower the viscosity thereof. To make a lighter weight panel, it is necessary to impregnate a smaller quantity of the isocyanate component homogeneously and the use of the solvent is recommended.

The non-woven cloth impregnated with the isocyanate component can be stored in a roll style, but it is necessary to package the roll with a moisture impermeable film, to prevent the dimerization of the isocyanate itself or the reaction with the moisture in the air, and to store it at a low temperature.

Preferably, a moisture impermeable film such as polyethylene is placed in contact with the non-woven cloth impregnated with the isocyanate component and they are wound up as a roll, the roll is packed with another moisture impermeable film such as polyethylene in the presence of nitrogen gas, and the package is stored in a dark and low temperature place.

However, it is safer to avoid long term storage and to use the non-woven cloth as soon as possible after the impregnation of the isocyanate component in the following process.

The practically thermoplastic formed material to be used as the core material is the same as explained in the first invention.

The second invention is explained in detail using EXAMPLES 13–17.

EXAMPLE 13

A block with a thickness of 300 mm, a width of 300 mm and a length of 300 mm was produced by mixing the raw materials as shown in TABLE 7. The quantity of isocyanate component corresponding to that of polyol component and water written in the formulation of TABLE 1 was 2 times by stoichiometric equivalent.

By slicing thus produced block 10 minutes after the production, a board was obtained with a thickness of 10 mm, a width of 250 mm and a length of 250 mm and a specific density of 0.031, which was rigid and somewhat brittle foamed material at room temperature, but thermoplastic with a softening temperature of 100° C. The thermoplastic board was sprayed with water on both sides and stored.

A solution of crude MDI (Sumitomo Bayer urethane Co.; SUMIDUR 44v20) diluted with methylenechloride at a volume ratio of 4:1 was prepared. As a non-woven cloth, UNITIKA Spanbond 90503WSO (UNITIKA Co.; polyester fiber, no-binder type, weight per unit area of 50 g/m$^2$, longitudinal tensile strength of 3.0 Kg/3 cm width, longitudinal elongation of 30%, transversal elongation of 20%) was impregnated in said crude MDI solution and wrung to bring the weight per unit area to 100 g/m$^2$.

TABLE 7

| Raw materials | Quantity used (grams) |
|---|---|
| Crude MDI: SUMIDUR 44v20*[1] | 108 |
| Polyol: GR-30 (OH Value = 400)*[2] | 30 |
| Polyol: FA-703 (OH Value = 33)*[3] | 40 |
| Water | 1.5 |
| Amine Catalyst: DABCO33LV*[4] | 0.5 |
| Tin Catalyst: NEOSTAN U-100*[5] | 0.1 |
| Surface active agent: L-5740*[6] | 0.5 |
| Organic foaming agent: F-11*[7] | 30 |

*[1]Sumitomo Bayer Urethane Co.
*[2]Takeda Pharmaceutical Co.
*[3]Sanyo Kasei Co.
*[4]Sankyo Air Products Co.; 33% DPG solution of triethylenediamine
*[5]Nitto Kasei Co.; dibuthyl Tin dilaurate
*[6]Nippon Unicar Co.; dimethylpolysiloxane + PO + EO
*[7]Asahi Glass Co.; monochlorotrifluoromethane Two sheets of impregnated non-woven cloth were laminated on both sides of the thermoplastic board sprayed with water on both sides, then press-molded in a flat mold with a thickness of 9 mm for 2 minutes and a rigid panel was obtained.

The same laminated material was press-molded for 2 minutes by deep drawing in a shape (1) as shown in FIGURE 1, using a metal mold heated at 110° C. Molded product was a deep draw panel without wrinkle. The physical properties of the non-woven cloth used and the panel obtained are shown in TABLE 8.

TABLE 8

|  | EXAMPLE | | | | |
|---|---|---|---|---|---|
|  | 13 | 14 | 15 | 16 | 17 |
| (A) Non-woven cloth | | | | | |
| Material | PE*[1] | PE | PE | PE*[2] | PE |
| Weight (g/m$^2$) | 50 | 15 | 100 | 50 | 50 |
| Tensile strength of longwise direction (Kg/2cm width) | 9 | 1.5 | 20 | 14 | 11 |
| (B) Panel plate | | | | | |
| Weight (g/m$^2$) | 510 | 440 | 600 | 510 | 510 |
| Bending strength | | | | | |
| at 25° (Kg/50 mm width) | 2.40 | 0.95 | 2.45 | 2.44 | 2.45 |
| at 80° (Kg/50 mm width) | 2.25 | 0.80 | 2.30 | 2.20 | 2.30 |
| Moldability | OK | OK | BAD*[3] | OK | OK |

*[1]Polyester
*[2]Polyamide
*[3]Wrinkled

EXAMPLES 14–17

Using non-woven cloths made of different kinds of fibers and different weight per unit area described below and the same thermoplastic foamed material and impregnating solution, a flat panel and a deep draw panel were manufactured in the same manner as EXAMPLE 13. The physical properties of the non-woven cloth used and the panels obtained are shown in TABLE 8.

EXAMPLE 14

As a non-woven cloth, UNITIKA Spanbond 90153WSO (UNITIKA Co.; polyester fiber, weight per unit area of 15 g/m$^2$, longitudinal tensile strength of 1.5 Kg/3cm width, transversal tensile strength of 0.5 Kg/3cm width, longitudinal elongation of 20%, transversal elongation of 15%) was used and impregnated in the crude MDI solution as used in EXAMPLE 13 and wrung to became the weight per unit area to 65 g/m$^2$.

EXAMPLE 15

As a non-woven cloth, UNITIKA Spanbond 71000WSO (UNITIKA Co.; polyester fiber, weight per unit area of 100 gm$^2$, longitudinal tensile strength of 20 kg/3cm width, transversal tensile strength of 7 Kg/3cm width, longitudinal elongation of 30%, transversal elongation of 21%) was used and impregnated in the crude MDI solution as used in EXAMPLE 13 and wrung to became the weight per unit area to 150 g/m$^2$.

EXAMPLE 16

As a non-woven cloth, UNITIKA Spanbond R0505WTO (UNITIKA Co.; polyamide fiber, weight per unit area of 50 g/m$^2$, longitudinal tensile strength of 14 Kg/3 cm width, transversal tensile strength of 4 Kg/3 cm width, longitudinal elongation of 30%, transversal elongation of 30%) was used and impregnated in the crude MDI solution as used in EXAMPLE 13 and wrung to became the weight per unit area to 100 g/m$^2$.

EXAMPLE 17

As a non-woven cloth, Asahi Kasei Spanbond E-1050 (Asahi Kasei Co.; polyester fiber, weight per unit area of 50 g/m$^2$, longitudinal tensile strength of 11 Kg/3 cm width, transversal tensile strength of 6 Kg/3 cm width, longitudinal elongation of 30%, transversal elongation of 35%) was used and impregnated in the crude MDI solution as used in EXAMPLE 13 and wrung to became the weight per unit area to 100 g/m$^2$.

COMPARATIVE EXAMPLE 1

A soft polyurethane foam sheet with a density of 0.015 g/cm$^3$ and a thickness of 10 mm, a width of 300 mm and a length of 300 mm was impregnated with the same solution for impregnation and wrung to became the weight per unit area to 500 g/m$^2$. This foam block was used as a core material and sandwiched between two sheets of non-woven cloth as used in EXAMPLE 13 impregnated with a crude MDI solution.

The sandwich sheet was sprayed with water on both sides, then press-molded at 100° for 3 minutes within a flat plate with a spacing of 10 mm and obtained a flat panel.

The same sandwich sheet was press-molded for 2 minutes by deep drawing in a shape(1) as shown in FIGURE 1, in the same manner as EXAMPLE 1 and obtained a deep draw panel with many wrinkles on the surface. The physical properties of the non-woven cloth used and the panel obtained are shown in TABLE 9.

TABLE 9

|  | Comparative 1 | EXAMPLE 2 |
|---|---|---|
| (A) Non-woven cloth | | |
| Material | PE*[1] | GF |
| Weight (g/m$^2$) | 50 | 100 |

TABLE 9-continued

|  | Comparative 1 | EXAMPLE 2 |
| --- | --- | --- |
| Tensile strength of longwise direction (Kg/3cm width) | 9 | — |
| (B) Panel plate |  |  |
| Weight (g/m$^2$) | 700 | 710 |
| Bending strength |  |  |
| at 25° (Kg/3cm width) | 2.65 | 2.75 |
| at 80° (Kg/3cm width) | 2.40 | 2.45 |
| Moldability | BAD*$^3$ | OK |

*$^1$Polyester
*$^2$Glass fiber mat
*$^3$Wrinkled

FIG. 3 shows the normal incident sound absorption coefficient of the composite panels obtained in example 13 and Comparative EXAMPLE 1, wherein the abscissa shows the frequency of the sound (Hz) and the ordinate shows the normal incident sound absorption coefficient (%). FIG. 3 indicates that the sound absorption coefficient of the sample of EXAMPLE 13 is higher than that the sample of Comparative Example 1.

COMPARATIVE EXAMPLE 2

A thermoplastic polyurethane rigid foam sheet with a density of 0.031g/cm$^3$ and a thickness of 10 mm was sprayed with water on both sides. A glass fiber mat with the weight per unit area of 100 g/m$^2$ was impregnated with a solution of crude MDI used in EXAMPLE 13. In the same manner as EXAMPLE 13, a glass fiber reinforced sandwich panel was manufactured. At the same time, the moldability at deep draw molding was examined. The physical properties of the non-woven cloth used and the panel obtained are shown in TABLE 9.

From TABLES 8 and 9, it will be understood that the composite panels of the EXAMPLES of the present invention is lighter than the composite panels of the Comparative EXAMPLES, and the decrease of the strength at higher temperature are less. FIG. 3 indicates that the sound absorption coefficient of the EXAMPLE of the present invention is excellent.

The third invention is a manufacturing method of a multi-layered composite panel using the above described rigid or semi-rigid foamed material according to the first invention, especially suitable for continuous production of the composite panel.

That is, the third invention is a manufacturing method of a composite panel which comprises the following steps:

(1) on a moisture impermeable film, deliver a mixture of raw materials containing isocyanate component, polyol component and organic foaming agent and/or water wherein an excess quantity of the isocyanate component than the stoichiometric equivalent to the polyol component and water to produce a practically thermoplastic foamed material;

(2) put a non-woven cloth on top of the foamed material produced and compressing them to make a practically thermoplastic integrated material;

(3) and cure mold the integrated material by contacting it with water or steam to react the isocyanate component remaining therein with water while heating.

Figure 5:
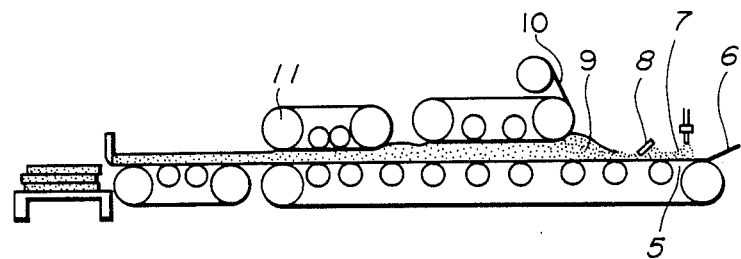
FIG. 5 illustrates an example of an apparatus for the first step of the continuous manufacturing method of a composite panel.
Figure 6:
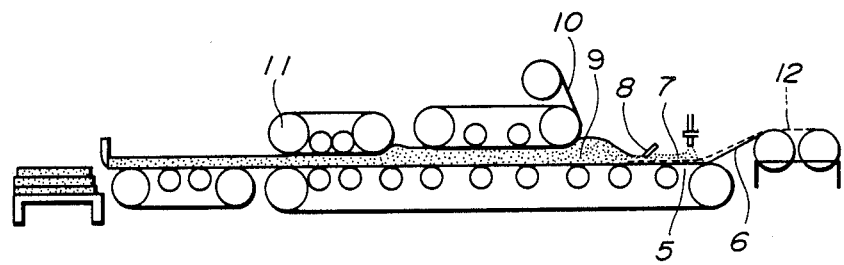
FIG. 6 illustrates another example of an apparatus for the first step of the continuous manufacturing method of a composite panel.

This method is explained in detail using FIGS. 5 and 6.

Figure 7:
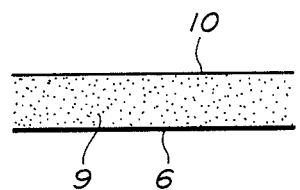
FIG. 7 illustrates the cross-sectional structure of the composite panel in EXAMPLE 18.

FIG. 5 illustrates an example of the first and the second step of the continuous manufacturing method of a composite panel. On a conveyor heated at an appropriate temperature, a moisture impermeable film is spread. A mixture of raw materials in a state of a cream having a composition according to the present invention is delivered on the moisture impermeable film, squeezed with a doctor to become a predetermined height, and turns into a practically thermoplastic foamed material. When the foaming material, and compressed continuously by a press to give a practically thermoplastic integrated material having a sectional structure as shown in FIG. 7 in which the moisture impermeable film, the foamed material and the non-woven cloth are laid on top the other in order.

FIG. 6 illustrates another example of the first and the second step in the manufacturing method of a composite panel.

On a conveyor heated at an appropriate temperature, a moisture impermeable film is spread, then a glass fiber non-woven cloth is spread thereon. A mixture of raw materials in a state of a cream having a composition according to the present invention is delivered on the glass fiber non-woven cloth, squeezed with a doctor to become a predetermined height, and turns into a foamed material. When the foaming reaction ended, a non-woven cloth is laminated on the foamed material, and compressed continuously by a press.

Figure 8:
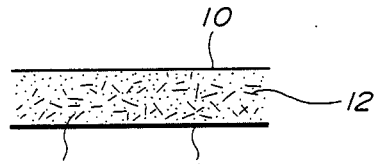
FIG. 8 is a cross-section of the composite panel in EXAMPLE 19.
Figure 9:
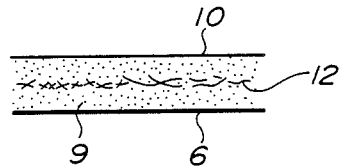
FIG. 9 is a cross-section of the composite panel in EXAMPLE 21.

Depending on the kind of the glass fiber non-woven cloth used, a practically thermoplastic integrated material having a sectional structure as shown in FIG. 8 in which the moisture impermeable film, the foamed material and the nonwoven cloth are laid on top of the other in order and disassembled glass fibers (12') are dispersed uniformly in the foamed material or a practically thermoplastic integrated material having a sectional structure as shown in FIG. 9 in which the moisture impermeable film, the foamed material and the non-woven cloth are laid on top of the other in order and a glass fiber non-woven cloth is placed in the middle portion of the foamed material.

As the third step, the practically thermoplastic integrated material having a sectional structure as shown in FIGS. 7, 8 or 9 is cure molded by contacting it with water or steam to react the isocyanate component remaining therein with water while heating and becomes a composite panel. If desired, facing material(s) can be laminated on it.

The composition of the mixture of raw materials should be one to give a practically thermoplastic polyurethane foam or polyurethanepolyurea foam having open cells. Preferably, from the view point to design a practical process line, the composition of the mixture of raw materials should be one to give a reaction profile in which the period from the mixing and agitation of raw materials to the cream rise is shorter.

The isocyanate component, the polyol component and the organic foaming agent can be selected from those described above, and the preferable ratio of these components is the same as described above.

The reason to put a moisture impermeable film on the conveyor first and then deliver a mixture of raw materials on the film is that to prevent the contamination of the conveyor with the mixture of raw materials.

As the moisture impermeable film to be used in the present invention, polyolefin film such as polyethylene film or polypropylene film can be used and will be tore away easily after the curing of the polyurethane foam. However, for the convenience to laminate and stick a facing material, it is recommended to use a hot-melt film (form example, polyolefin type hot-melt film) as the moisture impermeable film. The hot-melt film performs multipurpose role, namely, to prevent the pollution of the conveyor by the mixture of raw materials delivered on it for the production of the thermoplastic foamed material, to prevent the intrusion of the atmospheric moisture which causes the disappearance of thermoplasticity of the foamed material at storage, and to act as an adhesive for the lamination of facing material at finishing process.

Further, when a hot-melt film is used as the moisture impermeable film, it is unnecessary to tear away at the time of hot press with water or steam. Because the hot-melt film melts away instantly at heating and the water or steam can enter the inside of the thermoplastic foamed material freely and the reaction of the remaining isocyanate component and water proceeds uniformly.

The glass fiber non-woven cloth is effective to give stiffness as well as dimensional stability to the final product.

In general, to give a higher stiffness to a composite panel, it is more effective to apply the glass fiber non-woven cloth on both sides of the coreformed material as a sandwich. However, assuming to make a deep draw molded panel with complicated shape, the sandwich style integrated material apt to cause wrinkles at the time of deep draw molding with less follow-up ability to the mold and worse appearance even if the core foamed material is a thermoplastic one.

The inventors reviewed the style of glass fiber reinforcement and found that the better processability of the glass fiber reinforced foamed material can be attained when glass fibers are dispersed uniformly in the foamed material or a glass fiber non-woven cloth exists in the middle portion of the foamed material.

In order to disperse glass fibers uniformly in the foamed material or place a glass fiber non-woven cloth in the middle portion of the foamed material, it is accomplished by placing a glass fiber non-woven cloth on a moisture impermeable film and delivering a mixture of raw materials in a state of a cream thereon. If a glass fiber non-woven cloth which will disassemble when contacted with a cream of mixed raw materials is used, individual glass fibers will disperse in the foamed material, and if a glass fiber non-woven cloth which will not disassemble when contacted with a cream of mixed raw materials is used, the quantity of the cream which passes through the texture of the glass fiber non-woven cloth becomes approximately even, and the glass fiber non-woven cloth will be placed in the middle portion of the foamed material. Whether the glass fiber non-woven cloth will disassemble or not when contacted with a cream of mixed raw materials is caused mainly whether a binder is used or not to make the glass fiber non-woven cloth.

As the glass fiber non-woven cloth, a glass fiber chop strand mat as well as a glass fiber filament mat can be used in the present invention. However, in view point of to make a lightweight and high stiffness composite panel suitable to make a molded ceiling or a door panel for automobile use, a glass fiber filament mat which shows a higher reinforcing effect with smaller weight per unit area is recommended. In general, a glass fiber filament mat with a weight per unit area of 20–100 g/m$^2$, preferably of 30–80 g/m$^2$ is recommended.

The speed of the conveyor is decided considering the speed of delivery of the cream, the width of the thermoplastic foamed material to be produced, the density of the foam and the compression ratio of the foamed material at pressing. In general, conveyor speed to give a height of the foam of 1.5–10 times, preferably 2.0–4.0 times of the thickness of the pressed material is recommended. If the height of the foam is lower than 1.5 times of the thickness of the pressed material, the surface of the pressed material becomes uneven to worsen the appearance of it. On the contrary, if the height of the foam is higher than 10 times of the thickness of the pressed material, the density of the pressed material becomes higher and a light weight composite panel, which is the object of the present invention, cannot be produced.

Preferably, the conveyor is maintained at an appropriate temperature, namely 25–50° in consideration of the composition of raw materials. If the temperature is too low, not only the density of the bottom part of the foamed material becomes higher, but also the distribution range of the density of the foamed material in vertical direction becomes wider and cannot produce a homogeneous product. On the contrary, if the temperature of the conveyor is too high, the balance of foaming reaction and crosslinking reaction in the mixture of raw materials is deteriorated and apt to cause irregular and disordered cells in the foamed material.

The details of the third invention are explained using the following EXAMPLES.

EXAMPLE 18

Figure 4:
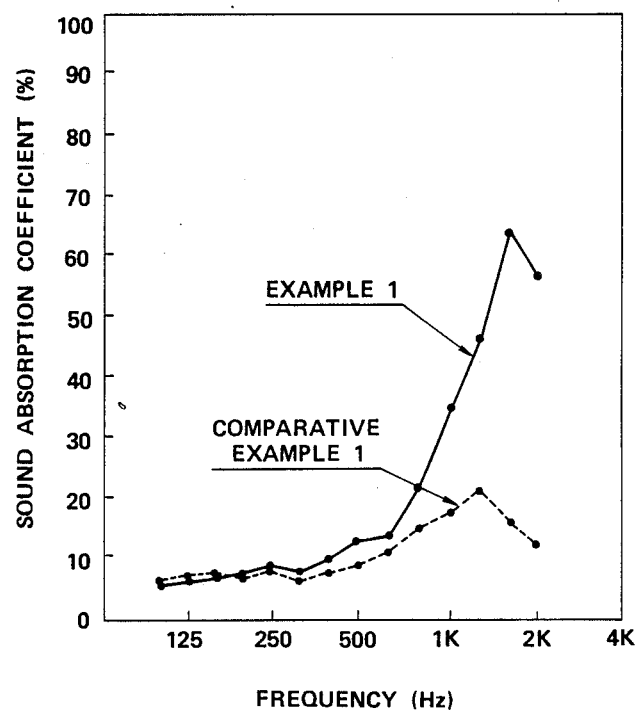
FIG. 4 shows the normal incident sound absorption coefficient of the composite panels obtained in EXAMPLE 5 and Comparative EXAMPLE 2, wherein the abscissa shows the frequency of sound (Hz) and the ordinate shows the normal incident sound absorption coefficient(%)

As the moisture impermeable film, a hot-melt film (DAICEL Chemical Co. M30; polyamide type, 27 g/m$^2$) was used and set on a conveyor (heated at 40°) in like manner as shown in FIG. 4. A cream prepared by mixing raw materials having a composition as shown in TABLE 10 with a three component foaming machine was delivered with a traversing motion onto the hot-melt film continuously and leveled to a thickness of 1.0 mm by a doctor. The cream begun to foam and became a foamed board with a thickness of 25–30 mm. When the foaming reaction ended, a non-woven cloth (UNITIKA Co. 90303WSO; polyester fiber, 30 g/m$^2$) was laminated on the foamed board, supplied to a double conveyor (heated at 50° C.) fitted with a spacer of 0 mm, and pressed continuously. The panel material with a thickness of 10 mm thus formed was cooled to the room temperature (25°) and became a rigid panel material which can be cut easily. This panel material had a sectional structure as shown in FIG. 5 in which the foamed board was covered with the hot-melt film on one side and with the non-woven cloth on the other side with a weight per unit area of 890 g/m$^2$.

When water was sprayed on both sides of the panel material, and a facing material with a weight per unit area of 300 g/m$^2$ was laminated on the surface of the hot-melt film and press molded at 110° for 2 minutes in a deep draw mold having a shape as shown in FIG. 1, a permanent set rigid panel in which the core foam and facing materials were molded in monoblock was obtained.

Further, when water was sprayed on both sides of the panel material and a non-woven cloth (UNITIKA Co. 90303WSO; polyester fiber, weight per unit area of 30 g/m$^2$) was laminated on the surface of the hot-melt film and press molded at 110l° for 2 minutes in a flat mold with a spacer of 9 mm thickness, a permanent set rigid flat panel was obtained. Bending strength of a test piece of the flat panel was measured by a method as shown in TABLE 11. It shows that the panel was lightweight rigid panel with excellent thermostability and dimensional stability.

TABLE 10

| | Quantity used (grams) | | | | | | |
|---|---|---|---|---|---|---|---|
| | EXAMPLE | | | | | | COMPARATIVE EXAMPLE |
| Raw material | 18 | 19 | 20 | 21 | 22 | 23 | 3 |
| polyol A*[11] | 30 | 30 | 30 | 30 | 30 | 30 | 30 |
| polyol B*[12] | 40 | 40 | 40 | 40 | — | 40 | 40 |
| polyol C*[13] | — | — | — | — | 40 | — | — |
| water | 1.0 | 1.0 | 1.5 | 1.5 | — | 1.5 | 1.0 |
| catalyst A*[14] | 0.5 | 0.5 | 0.5 | 0.5 | 0.5 | 0.5 | 0.5 |
| catalyst B*[15] | 0.1 | 0.1 | 0.1 | 0.1 | 0.1 | 0.1 | 0.1 |
| surfactant*[16] | 0.3 | 0.3 | 0.5 | 0.5 | 0.5 | 0.5 | 0.3 |
| foaming agent*[17] | 25 | 25 | 30 | 30 | 35 | 30 | 25 |
| crude MDI*[18] | 93 | 93 | 109 | 109 | 63 | 109 | 48.8 |
| (NCO Index) | 200 | 200 | 200 | 200 | 200 | 200 | 105 |

*[11]Takeda Pharmaceutical Co.; GR-30 (OH Value = 400)
*[12]Sanyo Kasei Co.; FA-703 (OH Value = 33)
*[13]Asahi Glass Co.; EL-910 (OH Value = 28)
*[14]Sankyo Air Products Co.; DABCO33LV (33% DPG solution of triethylenediamine)
*[15]Nitto Kasei Co.; NEOSTAN U-100 (dibutyl Tin dilaurate)
*[16]Nippon Unicar Co.; L-5740 (dimethylpolysiloxane + PO + EO)
*[17]Asahi Glass Co.; F-11 (monochlorotrifluoromethane)
*[18]Sumitomo Bayer Urethane Co.; SUMIDUR 44v20 (polymeric MDI)

TABLE 11

| | EXAMPLE | | | | | |
|---|---|---|---|---|---|---|
| | 18 | 19 | 20 | 21 | 22 | 23 |
| Weight (g/m$^2$) | 890 | 950 | 650 | 720 | 675 | 750 |
| Bending strength | | | | | | |
| at 25° (Kg/5cm width) | 3.06 | 4.35 | 2.75 | 3.30 | 3.00 | 3.35 |
| at 80° (Kg/5cm width) | 2.75 | 4.00 | 2.30 | 2.95 | 2.80 | 3.00 |
| Initial bending gradient | | | | | | |
| at 25° (Kg/5cm width mm) | 1.35 | 2.00 | 1.20 | 1.35 | 1.35 | 1.50 |
| at 80° (Kg/5cm width mm) | 1.05 | 1.40 | 1.00 | 1.00 | 1.10 | 1.25 |
| Elongation (%) | | | | | | |
| 80° for 24 hrs. | 0.35 | 0.25 | 0.35 | 0.30 | 0.20 | 0.15 |
| 25° for 24 hrs. in water | 0.15 | 0.05 | 0.05 | 0.10 | 0.10 | 0.05 |

EXAMPLE 19

As the moisture impermeable film, a hot-melt film (DAICEL Chemical Co. M310; polyamide type, 27 g/m$^2$) was used and set on a conveyor (heated at 40°) and a glass fiber non-woven cloth (Nitto Boseki Co. filament mat MF- 60P; 60 g/m$^2$) was set thereon in like manner as shown in FIG. 6. A cream prepared by mixing raw materials having a composition as shown in TABLE 10 with a three component foaming machine was delivered with traversing motion onto the glass fiber non-woven cloth continuously and leveled to a thickness of 10 mm by a doctor. The cream begun to foam and became a foamed board. When the foaming board. When the foaming reaction ended, a non-woven cloth (UNITIKA Co. 90303WSO; polyester fiber, 30 g/m$^2$) was laminated on the foamed board, supplied to a double conveyor (heated at 50°) fitted with a spacer of 10 mm, and pressed continuously. The panel material with a thickness of 10 mm thus formed was cooled to the room temperature (25°) and became a rigid panel material which can be cut easily. This panel material had a sectional structure as shown in FIG. 7 in which the foamed board was covered with the hot-melt film on one side and with the non-woven cloth on the other side and glass fibers were dispersed uniformly in the foamed material with a weight per unit area of 920 g/m$^2$.

When water was sprayed on both sides of the panel material and a facing material with a weight per unit area of 300 g/m$^2$ was laminated on the surface of the hot-melt film and press molded at 110° for 2 minutes in a deep draw mold having a shape as shown in FIGURE 1, a permanent set rigid panel in which the core foam and facing materials were molded in monoblock was obtained.

Further, when water was sprayed on both sides of the panel material and a non-woven cloth (UNITIKA Co. 90303WSO; polyester fiber, weight per unit area of 30 g/m$^2$) was laminated on the surface of the hot-melt film and press molded at 110° C. for 2 minutes in a flat mold with a spacer of 9 mm, a permanent set rigid flat panel was obtained. Bending strength of a test piece of the flat panel was measured by a method as shown in FIG. 9. The measured values and other properties are shown in TABLE 11. They show that the panel was a light weight rigid panel with excellent thermostability and dimensional stability.

EXAMPLE 20

On a glass fiber non-woven cloth as in EXAMPLE 19, a cream prepared by mixing raw materials having a composition as shown in TABLE 10 with a three component foaming machine was delivered with traversing motion continuously and leveled to a thickness of 0.7 mm by a doctor. The cream begun to foam and became a foamed board with a height of 25 –30 mm. When the foaming reaction ended, a non-woven cloth was laminated on the foamed board, supplied to a double conveyor fitted with a spacer of 10 mm, and pressed continuously in like manner as EXAMPLE 19. The moldability of the panel material at deep draw molding was excellent. Bending strength of the flat panel manufactured in like manner as EXAMPLE 18 was measured and the measured values and other properties are shown in TABLE 11. They show that the panel was a light weight rigid panel with excellent thermostability and dimensional stability.

EXAMPLE 21

As the moisture impermeable film, a hot-melt film (DAICEL Chemical Co. M310; polyamide type, 27 g/m$^2$) was used and set on a conveyor (heated at 40°) and a glass fiber non-woven cloth (Nitto Boseki Co. chop strand mat, length of strand 50 mm, 100 g/m$^2$) was set thereon. A cream having the same composition as EXAMPLE 20 was employed and a panel material was manufactured in like manner as EXAMPLE 20. The panel material obtained had a sectional structure as shown in FIG. 8 wherein a glass fiber non-woven cloth as it was existed in the middle portion of the foamed material. The moldability of the panel material at deep draw molding was excellent. Bending strength of the flat panel manufactured in like manner as EXAMPLE 18 was measured and the measured values and other properties are shown in TABLE 11. They show that the panel was a light weight rigid panel with excellent thermostability and dimensional stability.

EXAMPLE 22

A cream having a composition as shown in TABLE 10 was employed and a panel material was manufactured in the same manner as EXAMPLE 20. The panel material obtained had a sectional structure as shown in FIG. 8 wherein glass fibers were dispersed uniformly in the foamed material with a weight per unit area of 645 g/m². The moldability of the panel material at deep draw molding was excellent. Bending strength of the flat panel manufactured in like manner as EXAMPLE 18 was measured and the measured values and other properties are shown in TABLE 11. It shows that the panel was a light weight rigid panel with excellent thermostability and dimensional stability.

EXAMPLE 23

As the moisture impermeable film, a polyethylene film with a thickness of 35 micrometer was used and set on a conveyor and a glass fiber non-woven cloth as used in EXAMPLE 19 was set thereon. A cream having the same composition as EXAMPLE 20 was employed and a rigid panel material with a weight per unit area of 660 g/m² was obtained in like manner as EXAMPLE 20. The polyethylene film was taken off and isocyanate as shown in TABLE 10 was used as an adhesive. After spraying water to the panel material, a facing material with a weight per unit area of 300 g/m² was laminated and press molded in the same manner as EXAMPLE 18 and a permanent set rigid panel in which the core foam and facing materials were molded in monoblock was obtained.

COMPARATIVE EXAMPLE 3

A panel material was manufactured in the same manner as EXAMPLE 19 using raw materials having a composition as shown in TABLE 10. The panel material had a sectional structure as shown in FIG. 8 wherein glass fibers are dispersed in the foamed material with a weight per unit area of 920 g/m². However, when the panel material was press molded with a deep draw mold as shown in FIGURE 1, it was destroyed at the corner part of the deep part.

We claim:

1. A method of making a foam product comprising:
   reacting an isocyanate component with a polyol component and foaming with a foaming agent to form a self-supporting, intermediate foam material, said isocyanate component present in excess of a stoichiometric quantity needed to react with said polyol component;
   contacting said self-supporting, intermediate foam material with water; and
   heating said self-supporting, intermediate foam material to form a foam product, wherein said water reacts with remaining unreacted isocyanate component.

2. The method of claim 1, wherein said isocyanate component is present in an amount of from 1.05 to 5 times said stoichiometric quantity.

3. The method of claim 1, wherein said foaming agent is selected from the group consisting of chlorofluorocarbons and methylenechloride.

4. The method of claim 1, wherein said foaming agent is water.

5. A method of making a composite panel of a foam material comprising:
   reacting an isocyanate component with a polyol component and foaming with a foaming agent to form a self-supporting, intermediate foam material, said isocyanate component present in an excess of a stoichiometric quantity needed to react with said polyol component;
   contacting said self-supporting, intermediate foam material with water;
   impregnating a non-woven sheet with an isocyanate component;
   applying said impregnated nonwoven sheet onto said self-supporting; intermediate foam material;
   contacting said impregnated nonwoven sheet/self-supporting, intermediate foam material with water; and
   heating and laminating said impregnated nonwoven sheet/self-supporting, intermediate foam material to form a composite panel, wherein said water reacts with remaining unreacted isocyanate component in said self-supporting, intermediate foam material and said water also reacts with said isocyanate component in said impregnated nonwoven sheet.

6. The method of claim 5, wherein said isocyanate component which reacts with said polyol component is present in an amount of from 1.05 to 5 times said stoichiometric quantity.

7. The method of claim 5, wherein said foaming agent is selected from the group consisting of chlorofluorocarbons and methylene chloride.

8. The method of claim 5, wherein said foaming agent is water.

9. A method of making a composite panel of a foam material comprising:
   reacting, on a moisture-impermeable film, an isocyanate component with a polyol component and foaming with a foaming agent to form a self-supporting, intermediate foam material, said isocyanate component present in an excess of a stoichiometric quantity needed to react with said polyol component;
   applying a nonwoven sheet onto said self-supporting, intermediate foam material;
   contacting said nonwoven sheet/self-supporting intermediate foam material with water; and
   heating and laminating said nonwoven sheet/self-supporting, intermediate foam material to form a composite panel, wherein said water reacts with remaining unreacted isocyanate component.

10. The method of claim 9, wherein said isocyanate component is present in an mount of from 1.05 to 5 times said stoichiometric quantity.

11. The method of claim 9, wherein said foaming agent is selected from the group consisting of chlorofluorocarbons and methylenechloride.

12. The method of claim 9, wherein said foaming agent is water.

13. A method of making a composite panel comprising:
reacting an isocyanate component with a polyol component and foaming with a foaming agent to form a self-supporting, intermediate foam material, said isocyanate component being present in excess of a stoichiometric quantity needed to react with said polyol component;
placing a glass fiber mat on said self-supporting, intermediate foam material;
contacting said glass fiber mat/self-supporting, intermediate foam material with water; and
heating and laminating said glass fiber mat/self-supporting, intermediate foam material to form a composite panel, wherein said water reacts with remaining unreacted isocyanate component in said self-supporting, intermediate foam material.

14. The method of claim 13, wherein said isocyanate component which reacts with said polyol component is present in an amount of from 1.05 to 5 times said stoichiometric quantity.

15. The method of claim 13, wherein said foaming agent is selected from the group consisting of chlorofluorocarbons and methylenechloride.

* * * * *